Nov. 11, 1924.
J. B. GURY, JR., ET AL
1,515,478
INDUCTION MOTOR
Filed Feb. 4, 1921
2 Sheets-Sheet 1
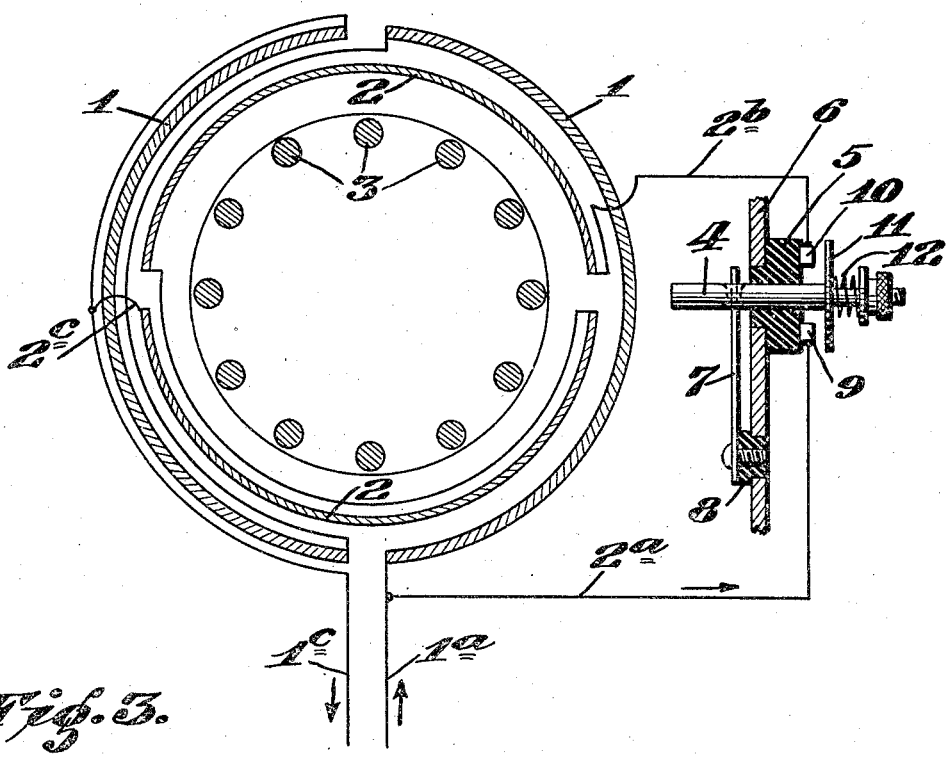
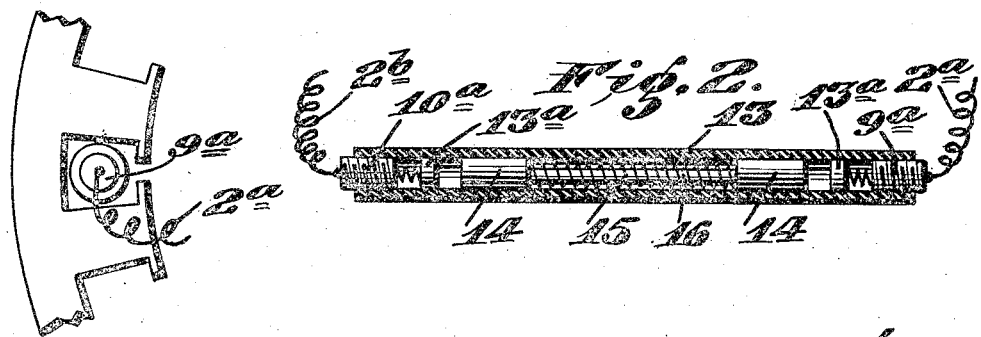
Inventors:
John B. Gury, Jr.
Robert H.E. Schlecht
By George A. Pennington
their Atty.

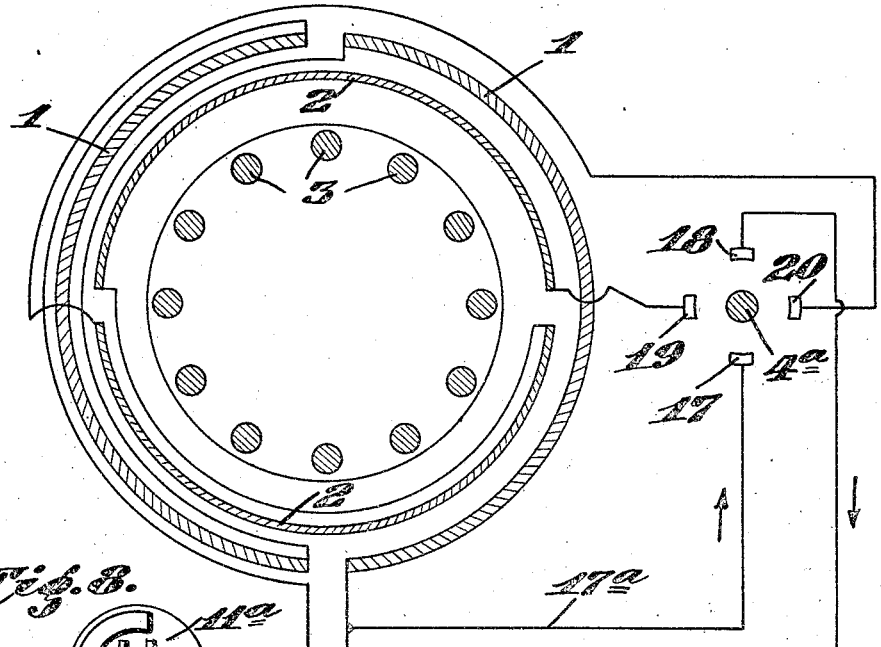
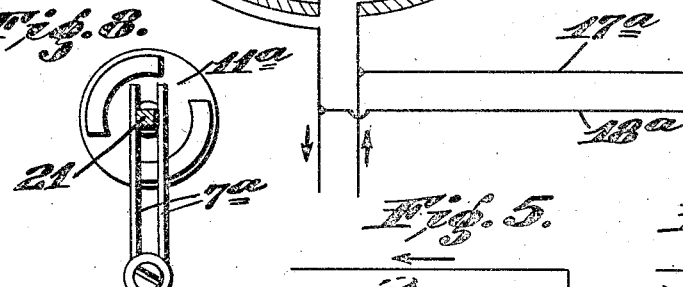
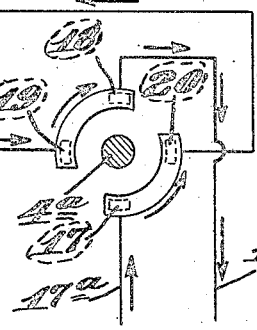
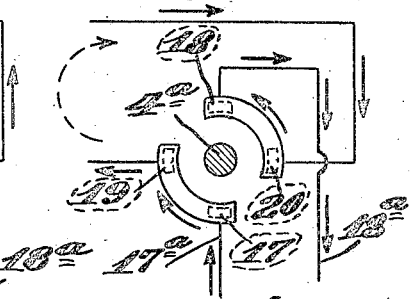
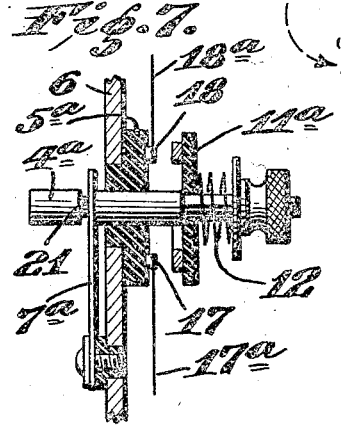

Patented Nov. 11, 1924.

1,515,478

UNITED STATES PATENT OFFICE.

JOHN B. GURY, JR., AND ROBERT H. E. SCHLECHT, OF ST. LOUIS, MISSOURI.

INDUCTION MOTOR.

Application filed February 4, 1921. Serial No. 442,377.

*To all whom it may concern:*

Be it known that we, JOHN B. GURY, Jr., and ROBERT H. E. SCHLECHT, citizens of the United States, and residents of the city of St. Louis and State of Missouri, have invented a certain new and useful Improvement in Induction Motors, of which the following is a specification.

This invention relates to induction motors, and it has more particularly to do with the control of the starting coils of single-phase motors of this type.

It is well known that a single-phase induction motor or one provided with only a single winding on the field, instead of two or more sets of windings differing in phase, will not start up of its own accord when connected to single-phase mains, but if the armature or rotor is given a start by hand, or otherwise, it will continue to rotate and gradually come up to speed in whatever direction it is thus started.

In some motors of this type, an auxiliary or supplemental winding is provided in the stator or field and is commonly known as the "teaser" or starting coil. This winding is of finer wire than the main winding and of very high resistance. Consequently, it is liable to burn out if maintained in action indefinitely or even for a reasonably short time after the motor is up to speed or in full step. Furthermore, it is not needed in the operation of the motor after the rotor is once started.

Mechanical devices have been provided to open the usual normally closed circuit of the starting coil after the motor has gotten up to speed or into step. In a common type of such devices the circuit closer is actuated to open the circuit through centrifugal force, which, of course, means that the motor must get up to sufficient speed before the device acts, and, in any case, the structure is more or less complicated and embodies several different working parts.

The present invention has for its objects to minimize the number of mechanical working parts and to produce a simple contrivance which is magnetically controlled and actuated rather than mechanically; and, further, to secure a quick release of the starting coil after the rotor is started as well as attain certain advantages as will hereinafter more fully appear.

The present invention comprehends broadly the utilization of a magnetically controlled circuit closer in a normally open circuit for the starting coil, whereby the circuit is closed through the agency of the excess magnetism in the main field or stator due to the rush of current at first in the main winding when connected to the line, said circuit closer including an actuator element or contrivance which is located on the motor in proximity to a pole-piece but is attracted only by an excess of magnetism above a certain minimum and is self-restored to normal position as soon as the said minimum is reached, or in other words, when the motor has gotten into step or up to speed.

In the accompanying drawing,—

Figure 1 is a diagram of the main field and starting coil windings of an ordinary two-pole, single-phase, induction motor having a circuit control for the starting coil according to the present invention;

Figure 2 is a detail view of a modification of the circuit closer;

Figure 3 is a fragmentary view of a pole-piece, showing how the modified circuit closer is placed in the motor;

Figure 4 is a diagram of an arrangement of the circuit closer for reversing the direction of rotation of the motor;

Figures 5 and 6 are detail diagrams showing the wire connections which may be effected to start the motor in different directions;

Figure 7 is a view partly in side elevation and partly in longitudinal section of the reversible circuit closer; and Figure 8 is a view of the same partly in end elevation and partly in cross section.

Referring now to the drawing, the numeral 1 designates the main field winding and the numeral 2 the starting coil winding. The armature 3 is of the usual squirrel-cage type.

In the circuit for the starting coil winding (see Figure 1) is a circuit closer including a metallic reciprocatory member 4 which is located in proximity to the center of the pole-piece of the field so as to be attracted by the latter when sufficiently magnetized. This member 4 is mounted to slide in a guide-block or bushing of non-conducting material 5 on the frame or casing of the motor 6 and it is yieldably held in normal position by a spring 7 which is attached at one end to a block or bushing of insulation material 8 on the casing 6, while its opposite end portion extends through a transverse aperture in the member 4.

On the insulation block 5 are two terminal contact members 9, 10, respectively for the starting coil lead wires 2ª and 2ᵇ.

The spring 7 is of just sufficient strength to resist the minimum attractive force of the magnetized field attained when the motor is in full step or up to speed.

When the current is first thrown into the main field coils the excess load magnetizes the field to a high degree, whereupon the member 4 is attracted and a metallic collar 11 thereon is drawn into contact with the terminal contact members 9, 10, thereby closing the starting coil circuit. The starting coil is thus energized and the rotor or armature is started, and, as soon as the rotor gets into step and the magnetism in the field thereby decreases, the member 4 is restored to normal position by the spring 7.

To secure a good electrical contact of the collar 11 with the terminal contact members 9, 10, it is slidably mounted on the member 4 and held normally in contact with a shoulder thereon by a coiled spring 12. By this arrangement the collar is brought into engagement with the terminal contact members before the member 4 reaches the limit of its travel towards the field.

The controlling device may be placed conveniently on the motor frame or casing, but in some cases the modified structure shown in Figure 2 may be inserted in one of the channels of the pole-piece or field. In this modification the two terminal members 9ª and 10ª are located in the opposite ends of a tube 13 of insulation material, and each terminal has a yieldable, spring-pressed contact 13ª opposed to which are a pair of slidable blocks 14 which are connected at their meeting ends by a spring 15 of conducting wire. Loosely within the spring 15 is a rod 16 which is disconnected from said blocks 14 but serves as a spacer to prevent them coming closer together than a given distance.

In utilizing this modification the tube is inserted in the channel of the pole-piece or field so that it extends across the same. The spacing rod 16 keeps the blocks normally in proper range to be attracted in opposite directions and towards the outer ends of the tube when the excess load is on the field at the start.

In both of the foregoing modifications the yieldable contact members overcome vibration so as to maintain a good electrical contact during the time the circuit should be closed.

In Figures 4 to 8, inclusive, a further modification of the circuit closer is illustrated. In this form the operation is substantially the same as in that shown in Figure 1, the only difference being that in the first form the motor is started in only one direction, while in the latter form provision is made for starting the motor in either direction. This reversal of direction is accomplished by changing the leads into the starting coil. On the insulation block 5ª are four terminal contact members 17, 18, 19 and 20, the first two of which are diametrically opposed and are respectively connected by the wires 17ª and 18ª with the leads of the main field winding. The two other terminals 19, 20, are diametrically opposed and connected respectively to the terminal leads of the starting coil.

In this last modification provision is made on the yieldable collar 11ª of the member 4ª for connecting the terminal members in respective pairs 18, 19, and 17, 20, at one and the same time, which will start the motor in one direction, and in pairs 17, 19, and 18, 20, respectively, which will start the motor in the opposite direction (see Figures 5 and 6).

To effect the adjustment for the change in direction, the member 4ª is provided with a reduced portion or neck 21 which is square in cross section, which reduced portion is straddled by a bifurcated spring member 7ª serving not only to yieldably hold the member in normal endwise position but also yieldably holds it from rotation. In this modification also the collar 11ª is slidable on a square shank or neck portion of the member 4ª to prevent it turning independent thereof but permitting it to be sufficiently yieldable to secure a good electrical contact with the terminal members on the block 5ª.

As hereinbefore stated, the invention comprehends broadly the idea of a magnetically controlled and operated circuit closer for the starting coil, and it therefore admits of considerable modification within its spirit as defined by the appended claims, and is not to be limited to the specific constructions and arrangements shown in the drawing.

What is claimed is:

1. In an induction motor of the single-phase type, having a main winding and a starting coil, the circuit of the starting coil being normally open, a magnetic circuit closer for said circuit, the same including an actuator element located in proximity to the center of a pole-piece of the main field whereby to be attracted by the magnetized pole-piece but only while attractive force is in excess of a certain minimum, said actuator being self-restored to normal position when the said minimum of attractive force is reached.

2. In a motor of the character described, in combination with the main field and the starting coil, a non-conducting support on the motor frame, said support having terminal contacts thereon for the starting coil leads, a self-retracting element mounted on said non-conducting support and being capable of electrically connecting said terminal contacts, but being normally out of engagement therewith, said self-retracting element being in attractive range of the main field whereby to be attracted by the excess magnetism of said field to close the starting coil circuit and to open said circuit when the motor gets up to normal speed.

3. In a motor of the character described, in combination with the main field and the starting coil, a non-conducting support on the motor frame, said support having terminal contacts normally disconnected in the starting coil circuit, a self-retracting element mounted on said support and having yieldable contact portions to electrically connect said terminal contacts of the starting coil circuit, but being normally out of engagement therewith, said self-retracting element being in attractive range of the main field whereby to be attracted only during the existence of excess magnetism in the main field at the starting of the armature.

Signed at St. Louis, Missouri, this 25th day of January, 1921.

JOHN B. GURY, Jr.
ROBT. H. E. SCHLECHT.